June 5, 1934.　　　　　G. M. CROSS　　　　　1,961,281
SHOCK ABSORBER
Filed Feb. 5, 1929　　　　3 Sheets-Sheet 1

Inventor.
Grosvenor M. Cross
by Heard Smith & Tennant.
Attys.

June 5, 1934.  G. M. CROSS  1,961,281
SHOCK ABSORBER
Filed Feb. 5, 1929   3 Sheets-Sheet 2

Inventor.
Grosvenor M. Cross
by Heard Smith & Tennant
Attys.

June 5, 1934.  G. M. CROSS  1,961,281
SHOCK ABSORBER
Filed Feb. 5, 1929  3 Sheets-Sheet 3

Inventor.
Grosvenor M. Cross
by Heard Smith & Tennant
Attys.

Patented June 5, 1934

1,961,281

UNITED STATES PATENT OFFICE 1,961,281

SHOCK ABSORBER

Grosvenor M. Cross, Boston, Mass.

Application February 5, 1929, Serial No. 337,679

33 Claims. (Cl. 188—89)

This invention relates to a means for controlling the movement between two bodies which are moved relatively toward and from each other in order to eliminate, neutralize or overcome undesirable forms of such movement. The invention involves certain broad principles and is therefore applicable to a wide range of uses and may be embodied in various types of mechanism. One type of mechanism in which the invention is preferably embodied and by means of which the invention may be practiced is a vehicle having a body supported by a spring or other suitable yielding means from the axle or other part of the running gear. Such a type of mechanism is exemplified in the ordinary automobile. There are here presented two bodies, namely, the vehicle body and the axle, which are movable relatively toward and from each other by the action and reaction of the interposed spring according to the load and the changing conditions of vehicle speed and road surface. A disclosure of the invention as applied to the control of the relative movement between the vehicle body and the axle of such an automobile will serve to illustrate not only a specific adaptation of the invention, but also the broad principles involved therein.

The invention has for one object to provide a device comprising a casing and a rotary piston therein connected one to one body and the other to the other body, in which the forces acting are neutralized so as to eliminate either or both thrust and torque on the rotary bearing surfaces between said members.

The invention has for its further object to provide novel means for automatically adjusting the device to take care of changes in static load.

The invention has for its further object to provide means for maintaining the required amount of operating fluid in a fluid operating device of this character.

The object of the invention is further to provide means for lubricating and maintaining the lubrication of the parts of the device where friction occurs.

These and other objects and features of the invention will more fully appear from the accompanying description and drawings and will be particularly pointed out in the claims.

The drawings illustrate a simple and preferred form of the invention as applied to an ordinary type of automobile for controlling the movement between the vehicle body and axle. In this specific illustration, the invention is also embodied in a fluid operated mechanism comprising two main elements, one connected to the vehicle body and the other to the axle, one of these elements being shown as a rotary oscillating piston and the other as a chambered casing in which the piston oscillates. But it is to be understood that these and the other features illustrated are, so far as the broader principles of the invention are concerned, but exemplifications of the broad principles of the invention.

Figure 1:
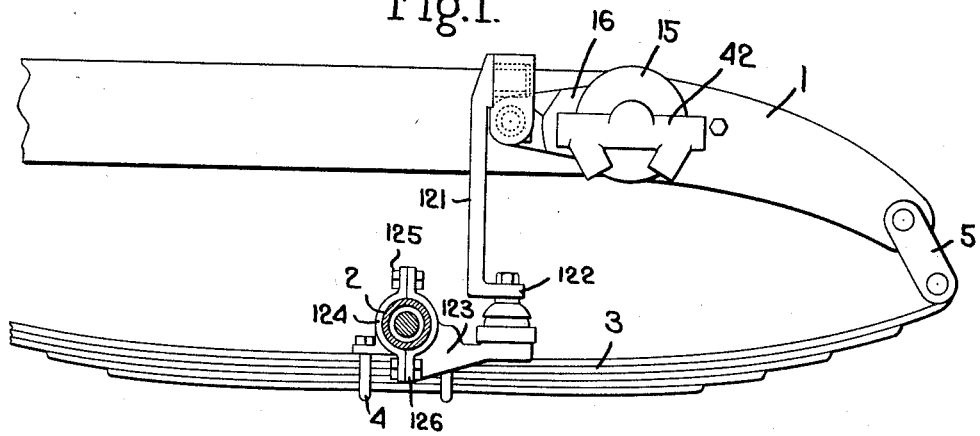
Fig. 1 is a side elevation of a portion of an automobile body and axle and spring, together with a device embodying a preferred form of the invention.

The two bodies which have a limited relative movement toward and from each other, the movement of which is controlled by this invention, are herein typically illustrated for the purpose of the disclosure of a preferred form of the invention as the body and axle of an automobile. In the case of an automobile, a device embodying the invention will preferably be employed in connection with each wheel because each axle at each wheel has an independent movement relatively toward and from the body. It is sufficient, therefore, to describe a specific embodiment of the invention at one of these locations. A portion 1 of the longitudinal side frame member of the chassis is shown together with the axle 2 and the usual spring 3 connected by the clamp 4 to the axle and by the link 5 to the frame member 1.

The device shown as embodying the invention comprises two main elements, one of which is connected to the axle and the other of which is connected to the vehicle body. These two elements are shown as a hollow casing member and a piston member fitting the casing for relative rotation therein. In the illustrated embodiment, the piston member is rigidly secured to the frame member 1 while the casing member is connected by means of a link to the axle so that as movement takes place between the body and axle of the vehicle, the casing rotates with respect to the piston.

The piston 6 comprises a hub 7 terminating in a shoulder 8, and a shank having a polygonal section 9 and a cylindrical threaded end 10. The polygonal section 9 fits a corresponding aperture in the frame 1 and preferably also a reinforcing plate 11 bolted at 12 to the frame. The shoulder 8 abuts the outer face of the frame 1 and a nut 13 and washer 14 on the threaded end 10 serve therewith firmly and rigidly to clamp the piston member to the frame.

The hollow casing is shown as comprising a base member 15 having an integral laterally extending arm 16 and a generally exteriorly threaded cyindrical portion 17 and a cup-shaped cap member 18 fitting over the hub 7 of the piston and threaded to the portion 17 of the base member. A packing gland is provided between the cap member 18 and the piston hub 7 and is shown as a thimble 19 embracing the hub threaded into the cap member 18 and forcing a suitable packing 20 against the piston hub. The thimble is provided with a toothed flange 21 by which it may be screwed in and out and its inner end is bevelled at 22 to cam the packing against the piston hub.

The casing member and the piston member together present a plurality of radially and symmetrically disposed blades which form the end walls of a plurality of sector chambers between the casing and the piston hub, the outer walls of these chambers being formed by the inner cylindrical surface of the casing and the inner walls being formed by the cylindrical surface of the piston hub. The inner surfaces of the blades which project from the casing are concentric with the central axis of the piston and casing and consequently concentric with the inner cylindrical surface of the casing, but these blades are of different radial length, the hub of the piston member having outer surfaces of radii corresponding respectively to the inner surfaces of the casing blades. The purpose of this peculiar construction, the principle of which will later be explained, is to reduce to a minimum or practically eliminate radial thrust between the casing and piston members. In the construction illustrated, the piston member and the casing member are each provided with two radial blades. The blades 23 and 24 of the casing member are shown as blocks secured to the casing member by pins 25 and 26. These blades fit tightly against the inner cylindrical wall 27 of the casing body member 15 and present at their inner ends concentric cylindrical surfaces. It will be seen that the end walls 28 of the blade 23 are considerably longer than the end walls 29 of the other blade 24. The hub 7 of the piston member presents the cylindrical surfaces 30 and 31 formed on different radii so that these surfaces fit snugly against the inner cylindrical surfaces of the respective casing blades 28 and 29. The two blades 32 and 33 of the piston member are preferably formed integrally therewith and are symmetrically disposed. Each of these blades has a cylindrical outer end fitting against the inner cylindrical surface 27 of the casing member, while the end walls 34 correspond in length to the end walls 28 of the blade 23 and the end walls 35 correspond in length to the end walls 29 of the blade 24. The arrangement is such that there is thus formed between the casing member and the piston member 4 sector-shaped chambers 36, 37, 38 and 39 symmetrically disposed. Passages 40 and 41 extending diametrically through the piston hub connect respectively the chambers 37 and 39 and the chambers 36 and 38. It will thus be seen that each pair of chambers with the connecting passages constitutes in effect a single chamber, the total volumetric capacity of each of which is the same. The piston member may therefore be said to divide the casing into two effective chambers.

The control of the relative rotary movement between the casing member and piston member is effected by controlling the flow of a liquid such as oil from one of these effective chambers to the other and vice versa. For this purpose these two effective chambers are connected by two passages in the casing member and these passages are provided with valves for controlling the flow of fluid therethrough. In the illustrated construction, a transversely extending hollow boss 42 is formed on the casing member 15 and this boss contains the controlling valves for these passages. At its central portion the hollow interior of the boss presents a cylindrical chamber 43 opening against the outer end of the piston hub. The extreme ends of the boss are closed by plugs 44 seated therein and held in place by threaded plugs 45 threaded therein at 46 and 47 respectively. Each plug contains an axial chamber 48 and 49, respectively, presenting at their inner ends valve seats. The boss 42 is provided, as shown, near each end with depending hollow extensions 50 and 51 respectively, which communicate with the interior of the boss. Tubular members 52 and 53, respectively, are fitted in the extensions 50 and 51 and present at their inner ends valve seats and the outer ends of the extensions 50 and 51 are closed by threaded plugs 54 and 55, respectively. The two passages which connect the effective chambers 37—39 and 36—38, the flow of fluid through which is controlled, are, in the construction illustrated, first, the passage comprising a bore 56 extending from the chamber 37 through the casing member 15 and boss 42, the bore 57 communicating therewith and opening into the axial chamber 49, the interior of the boss 42 opening into the extension 51 and the bore 58 opening from the interior of the tubular member 53 through the boss and casing into the chamber 38 and, second, the corresponding passage 59, bore 60, interior portions of the boss and extension 50 and bore 61 extending from the chamber 36 to the chamber 39. Check valves 62 and 63, respectively, are mounted in the sleeves 52 and 53 to cooperate with the valve seats at the inner ends thereof. These check valves are formed on the end of stems mounted to slide in bosses 64 and 65 projecting inward from the caps 54 and 55, respectively, and are held seated by helical springs 66 and 67, respectively. Hence flow of fluid from the chamber 36 to the chamber 39 may take place against the tension of the spring 64, but flow of fluid in the opposite direction is prevented by the check valve 62 and correspondingly, flow of fluid may take place from the chamber 37 to the chamber 38 but is prevented in the opposite direction. Control valves are also provided for the valve seats at the inner ends of the axial chambers 48 and 49. In the construction illustrated, the main interior bore of the boss 42 has its axis located beneath the axis of the piston and casing members and in this bore is mounted a slide 68 of generally tubular construction. This slide is provided at each end with a valve cooperating with the valve seats at the inner ends of the axial chambers 48 and 49. These valves are shown as plungers 69 and 70 adapted to seat on the valve seats and guided in helical springs 71 and 72 fitted in the ends of the tubular slide 68 and abutting flanges 73 and 74 on the plungers so that the springs tend to hold the plunger valves on their respective seats. A stud 75 is mounted eccentrically in the outer end of the piston hub and cooperates with the slide 68 when the parts are in normal position so that the slide stands in mid-position with both plunger valves 69 and 70 seated and with the springs 71 and 72 under equal tension. When, however, relative rotary movement takes place between the piston and casing members, as when the arm 16 is moved up or down, the tension of one of these springs is increased and that of the other relieved because the slide is moved one way or the other due to the eccentric position of the stud 75.

If the normal distance between the two relatively movable bodies, such as the vehicle body and the axle, remained constant, or if, as in the case of the illustrative application of the invention to the automobile, the static load remained constant, the eccentric stud 75 could cooperate with the slide 68 to secure the desired results by engaging a slot or recess formed directly therein. But the normal distance or the normal static load under ordinary conditions is frequently changing and it becomes necessary, therefore, to provide means whereby such a change or variation shall automatically be taken care of or compensated for in the present invention. In the selected embodiment of the invention illustrated, this result is secured by providing a dash-pot connection between the eccentric stud 75 and the slide 68. This connection has a sluggish movement so that there is no material change in the position of the connection as a result of the usual relative movements which take place between the body and axle due to deflection and restoration of the spring. But if there is a change in the static load which results in a corresponding change in the normal tension of the spring, then the dash-pot connection will gradually assume a new normal position such that, with the casing and piston members standing in the new normal position of relative rotation, the normal tension of the springs 71 and 72 will be equalized. For this purpose the tubular slide 68 is recessed facing the stud 75 at 76 and in the central portion of the slide is mounted a closely fitting dash-pot piston 77 having a recess 78 in its side adapted to fit over and cooperate with the stud 75. The slide 68 is formed at a distance from each end of the dash-pot piston with partition walls 79 and 80. One of these, as 79, may be integral with the slide, but one, as 80, is preferably removable to enable the dash-pot piston to be inserted in the slide. The removable wall 80 is shown as secured in place by a transverse pin 81 which projects exteriorly of the slide 68 and rides in a groove 82 formed longitudinally in the wall of the boss 42 so as to prevent the slide 68 from rotating. There are left between the ends of the dash-pot piston and the walls 79 and 80 chambers 83 and 84, respectively, which will be full of the fluid or oil employed so that no movement of the dash-pot piston with respect to the slide can take place except as this oil is forced out of the one chamber and into the other. A small duct 85 extends through the dash-pot piston and opens into the chambers 83 and 84 and permits the desired slow shift of the dash-pot piston with respect to the slide when a change in the normal rotary position of the casing 15 and piston 6 takes place such as results from a change in the static load.

A further refinement of the dash-pot connection between the eccentric stud 75 and the slide 68 is provided in the construction illustrated because the dash-pot piston, when subject to thrust in one direction, produces a very high pressure in the chamber 83 or 84 toward which it intends to move and as there must be a sliding fit between the dash-pot piston and the slide and, as will hereafter appear, the dash-pot piston is elsewhere subject to substantially atmospheric pressure, some oil will be forced out of the chamber toward which the dash-pot intends to move around the piston under this high pressure, but a corresponding amount will not flow into the opposite chamber under atmospheric pressure. The result would be gradually to pump the oil from one or both the chambers and thus destroy the function of the dash-pot connection. To obviate this, the zones of the ends of the dash-pot piston sliding in the slide 68 are made of an equal effective length by forming at equal distances from each end the annular grooves 86 and 87 and extending longitudinal grooves 88 and 89 from each respectively into the recess 78. Then each end of the dash-pot piston is bored out or recessed at 90 and 91. A small aperture 92 connects the recess 90 with the recess 78 and a corresponding aperture 93 connects the recess 91 with the recess 78. Check valves, shown as the balls 94 and 95, seat against the enlarged outer ends of the apertures 92 and 93 respectively and are held in position by light, helical springs 96 and 97, the larger ends of which fit into internal annular grooves in the ends of the dash-pot piston. These check valves act to permit free flow of oil into the chambers 83 and 84 upon any reduction of pressure therein. Consequently both chambers are maintained full of oil at all times.

Figure 8:
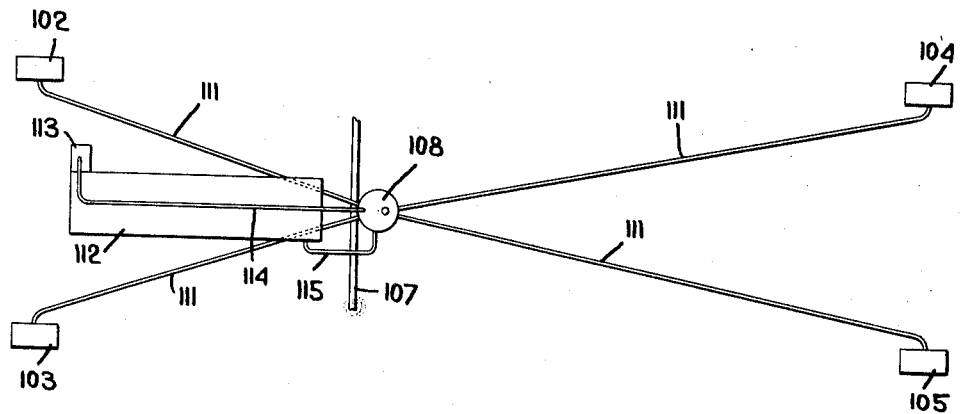
Fig. 8 is a diagrammatic plan view illustrating a means for supplying oil to a set of four shock absorbing devices in an automobile.
Figure 9:
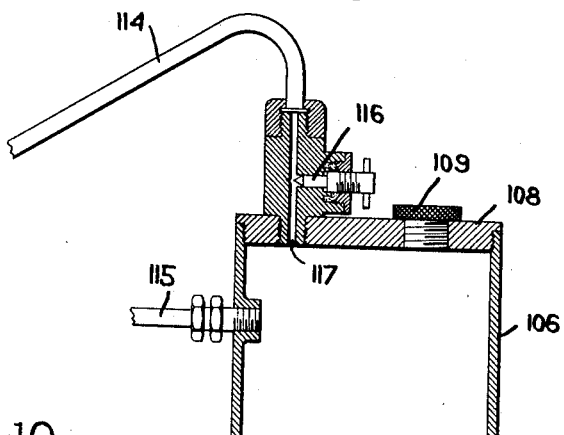
Fig. 9 is a view in vertical cross section of the oil reservoir shown in Fig. 8.

Suitable means are provided for filling and maintaining full of the operating fluid such as oil the casing member 15 and the various chambers and passages connected therewith. A filling opening 98 is shown at the top of the piston casing 15 closed by a threaded plug 99 and a drainage opening 100 closed by a threaded plug 101 is shown at the bottom. Preferably, however, in the case of an automobile, where four of the devices are employed, one adjacent each wheel, a single fluid reservoir is mounted on the body at or above the level of the casing members with conduits leading from this reservoir to each device and preferably also means are provided for maintaining the level of fluid in the reservoir. Such an arrangement is illustrated diagrammatically in Fig. 8 with a simple construction of reservoir illustrated more in detail in Fig. 9. The four devices are here shown respectively at 102 and 103 for the front wheel and at 104 and 105 for the rear wheels. The reservoir is shown as a tank 106 mounted on a suitable support such as the dashboard 107 above the level of the four devices. This tank has a cover 108 threaded therein and provided with a threaded plug 109 for a hand filling opening. A suitable drainage plug 110 is threaded into the bottom. Conduits shown as pipes 111 are connected into the reservoir tank near the bottom and extend therefrom to the various devices 102, 103, 104 and 105. Thus so long as the reservoir is maintained full of oil, it is assured that each and all of the devices shall be full of oil regardless of any slight leakage or wastage that may take place. In addition, means are provided for maintaining the reservoir full of oil. In the illustrated case, this is done by pumping the oil from the crank case in the engine continuously into the reservoir. The engine indicated at 112 is provided with a usual pump 113 for circulating the oil therein. In this case a by-pass 114 extends from the pump into the reservoir while an overflow pipe 115 extends from the reservoir back to the circulatory system of the engine. The amount of flow from the by-pass 114 to the reservoir may be adjusted by a valve such as the hand-operated valve 116 which, as it is screwed in or out, diminishes or enlarges the passageway 117. With this system, the engine will maintain the reservoir 106 full of oil and the reservoir in turn will maintain all of the devices connected thereto full of oil.

Figure 4:
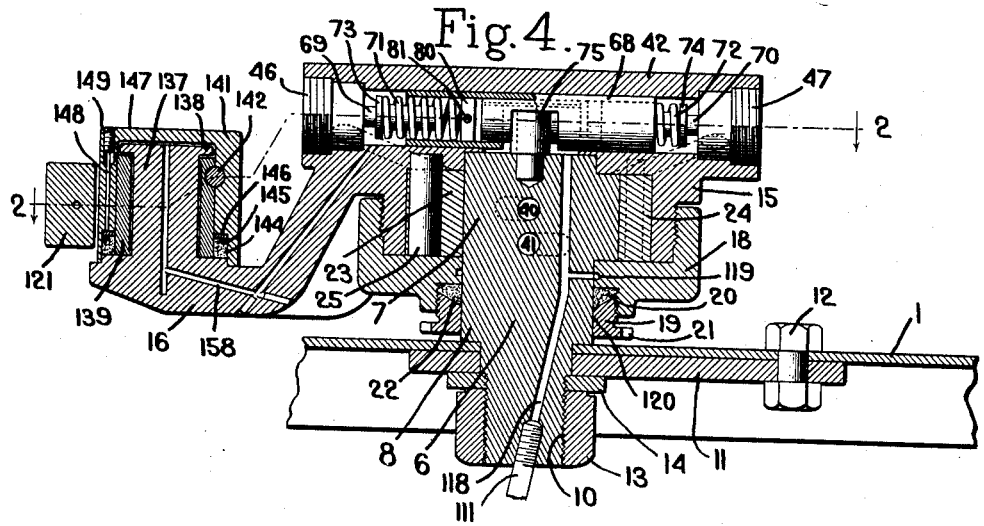
Fig. 4 is a view in transverse cross section taken on the line 4—4 of Fig. 2.
Figure 5:
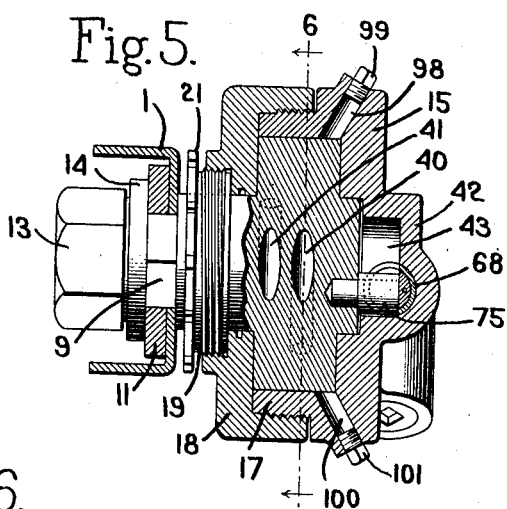
Fig. 5 is a view in vertical cross section taken on the line 5—5 of Fig. 2.
Figure 6:
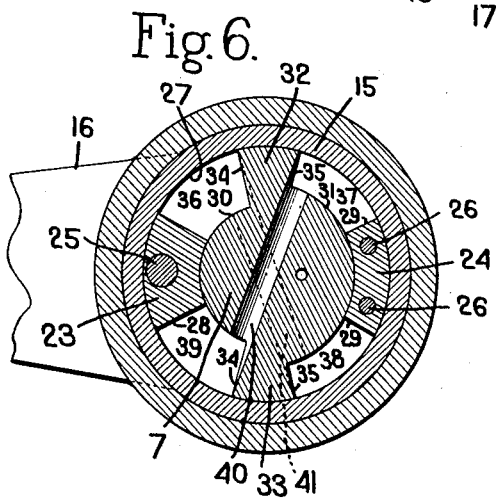
Fig. 6 is a view in vertical cross section taken on the line 6—6 of Fig. 5.
Figure 7:
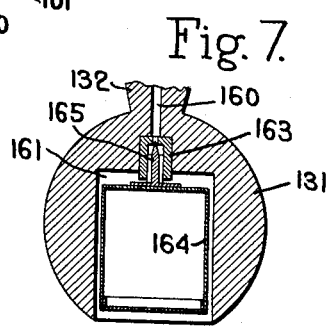
Fig. 7 is a view in vertical cross section of a portion of the lower joint of the link shown in Fig. 2.

A preferred connection of a conduit 111 with the interior of the device is shown in Fig. 4. The piston hub is provided with a duct 118 extending longitudinally thereof and opening through the outer end thereof into the chamber 43 of the boss 42. The end of the conduit 111 is threaded tightly into the enlarged end of the duct 118 at the threaded end of the piston hub. From the chamber 43 the oil will gradually work into all the other passages and chambers to replace any that may work or leak out during the operation of the device.

Since the oil in the sector chambers between the casing and piston members is under great pressure, it tends to work past the packing gland 22 and in order further to protect this joint, an annular groove 119 is formed in the casing member 18 just inside of the packing gland 20 and a radial duct 120 extends from the duct 118 and opens into this groove so that oil reaching the groove 119 will feed into the duct 118 and thus not be forced past the packing gland.

It has already been pointed out that the blades 23 and 24 which project from the casing member 15 are of different radial length in order to secure a torsional equilibrium between the forces exerted to effect relative rotary movement of the two members of the device such as the piston member and the casing or piston chamber member on the one hand and the force acting at the end of the lever arm on the other hand and in order to reduce to a minimum or practically eliminate radial thrust between the casing and piston members. The idea is to approach as nearly as possible to a frictionless bearing between the casing member and the piston member. The force exerted, as by the link connection, at the end of the lever arm, is opposed by the fluid pressure between the piston and casing members. These forces are resoluble into two components, one acting to effect relative rotation, and the other acting radially. The object of this feature of the invention is to produce what is herein termed "torsional equilibrium" between the components acting to produce relative rotation so that the piston and casing members may rotate relatively without any lifting or depressing strain being applied directly to the bearing between them. The object is further to reduce to a minimum the effect of the other components so that there is a minimum resultant radial thrust between the end of the arm and the rotary axis. This latter is somewhat approximate and is based upon eliminating such radial thrust under an average set of conditions for an average range of movement.

Figure 10:
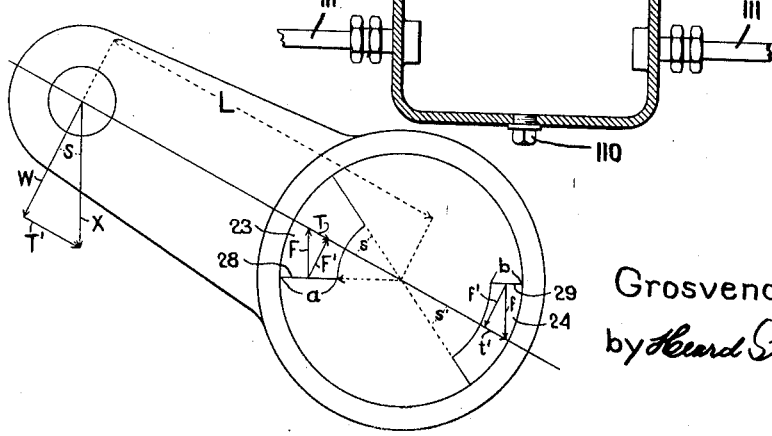
Fig. 10 is a diagrammatic view illustrating certain principles of construction in the device.

The principle upon which the foregoing result is secured by thus differentiating the length of the blades 23 and 24 is illustrated by the diagram in Fig. 10 and may be best explained by a concrete example. If L is the effective length of the arm extending from the piston casing and to which the link or other connection is made, and it be assumed that a force X is exerted through the link or other connection on the end of the arm, this force is resolved into two components, W producing torque or acting to rotate the arm and T' exerting a radial thrust. As the arm swings vertically above and below its normal position, the ratio between these components will vary somewhat, the thrust component being greater at the extreme positions, but by assuming a mean, the error will be distributed over the extent of travel. Now it will be apparent that the force X is opposed by the internal pressure exerted against the end walls 28 and 29 of the blades 23 and 24, which pressure may be represented graphically by the forces F and f, each of which may be resolved into the components F' and f' acting to produce torque or rotation in opposition to the force W, and the components T and t acting radially to produce thrust along the same line that the force T' acts.

To determine then the dimensions with which the device will exert the least possible force on the bearing between the piston and casing members, the forces will be considered from the standpoint, first of thrust and, second, of torque.

*Thrust.*—The lever arm 16 swings upward and downward from an approximately horizontal normal position. As it swings upward, the link or strut 121 makes an acute angle with the arm and as it swings downward, an obtuse angle. As in each case, the restraining force is exerted on the return direction only, the forces are reversed approximately as the angles are reversed with the result that the force of thrust is always inward from the pivotal axis between the link and the lever arm to the pivotal axis between the piston and casing members. This thrust is to be counterbalanced so far as possible by the thrust component of the forces exerted on the faces 28 and 29 of the blades and which depend upon the angle of these faces with respect to the line extending from the pivotal connection between the link and the lever arm to the axis of rotation of the piston and casing members and upon the area of the faces. Since the angle $s$ and angle $s'$ of the faces 28 and 29 are fixed while the angle S between the link and the lever arm is constantly varying, an average value of angle S must be determined. This determination may best be made graphically from a diagram of the particular construction employed. For the angle S so determined, the angle $s$ and the angle $s'$ of the faces 28 and 29 will be determined so that the thrust component of the force exerted along the arm will be balanced by the thrust components of the forces exerted on the faces 28 and 29.

*Torque.*—The component of the force exerted at the end of the lever arm and of the forces exerted on the faces 28 and 29 acting normal to the line extending from the pivot between the link and the end of the lever arm to the axis of rotation must be in equilibrium at all times, thus leaving no force acting directly against the pivotal axis.

We find, then:

(1) $\angle s = \angle s'$. If these angles were not equal, opposite chambers of the piston casing would be of unequal size and circumferential length, which would result in an unbalanced pressure on the pivotal axis. So long as these angles are equal, the fluid pressures against the peripheries of opposite chambers, that is, the radial pressures, will be balanced.

(2) $W = F' - f'$. This follows from the assumption that the system is to be in torsional equilibrium, that is, a balancing of all the forces acting normal to the line extending from the pivot between the link and lever arm to the rotary axis and independently of this axis.

(3) $T' = T - t$. This follows from the assumption that at the average position chosen, the thrust on the blades 23 and 24 is to balance the end thrust $T'$ due to the angle of the link to the lever arm.

$$\therefore \quad (4) \quad \frac{W}{T'} = \frac{F' - f'}{T - t}$$

But $$(5) \quad \frac{F'}{T} = \frac{f'}{t},$$

since $\angle s = \angle s'$ $$\therefore \quad (6) \quad \frac{W}{T'} = \frac{F'}{T} = \frac{f'}{t}$$

By substituting, first, the value of $F'$ and, second, the value of $f'$ from (5) in (4).

Thus it is shown that:

$$\angle S = \angle s = \angle s'$$

With this angle determined, values for $a$ and $b$ may be determined for any specific construction as follows:

Assuming: $W$=An assumed force acting at the end of the lever arm determined by the proportions of the vehicle spring, degree of deflection, amount of load and desired fluid pressure within the device $L$=Length from pivot between link and lever arm to rotary axis of piston and chamber members $a$=Length of the face 28
$b$=Length of the face 29
$w$=Width or thickness of the blades 23 and 24
$P$=Desired pressure in pounds per square inch in the sector chambers
$r$=radius of the inner cylinrical surface of the blade 23

We have, then:

$$(7) \quad W\left(L + \left(r + a - \frac{b}{2}\right)\cos \angle S\right) = Pwa(\cos \angle S)\left(2r + 1.5a - \frac{b}{2}\right)\cos \angle S$$

on the assumption of torsional equilibrium.

$$(8) \quad W\left(L + \left(r + a - \frac{b}{2}\right)\cos S\right) = Pwa(\cos S)^2\left(2r + 1.5a - \frac{b}{2}\right)$$

simplifying (7)

(9) $Pwa(\sin S) - Pwb(\sin S) = X \sin S$, on the assumption of counterbalancing thrust.

(10) $(a - b)Pw = W \sec S$ by simplifying (9).

Since in Equations (8) and (10) all the quantities are known except $a$ and $b$, these equations are readily solvable for $a$ and $b$ and the length of the blades may therefore be determined from the known values.

We may now take a specific illustrative example and make specific assumptions.

$w$=1.25, giving a reasonable width of the sector chambers $r$=1, giving a substantial hub cross section $P$=3000, being a reasonable pressure in the sector chambers $W$=1100 ⎱ determined by the proportions of the
$T'$= 560 ⎰ vehicle spring, degree of deflection, load, etc.

$L$=5.5, a reasonable length of arm.

Without following through the calculations in detail, it will be found that with these conditions the angles $S$, $s$ and $S'$ equal 27°; $a$, or the radial length of the blade 28, equals .816; and $b$, or the radial length of the blade 24, equals .486.

Since a device of this invention operates similarly in both directions of the relative rotation of the casing and piston members, it is necessary to provide a link connection which will take both tension and compression. When, as in the case of an automobile, there is more or less relative movement between the axle and body other than the relative movement directly toward and from each other, it is also necessary to provide a substantially universal connection at each end of the link construction employed. Furthermore, as this link connection with its universal joints, particularly in the case of an automobile, is constantly moving, under considerable strain, and located where it is exposed to dust, dirt, etc., it is necessary to provide for thorough lubrication and to protect against dirt and wear. A link connection satisfying all of these requirements forms a part of this invention and a preferred form of construction is illustrated. The link strut 121 extends substantially vertically or in line with the direction of normal relative movement between the two members such as the body 1 and axle 2. At its lower end this strut presents a transversely extending foot 122 and this foot is connected by a universal joint with a bracket 123 rigidly secured to the axle. The body of the bracket 123 fits around one side of the axle, while a complementary cap 124 fits around the other side and the two parts are flanged and bolted together at 125 and 126 to clamp the axle between them. But any suitable means may be provided for rigidly securing the bracket to the axle.

Figure 2:
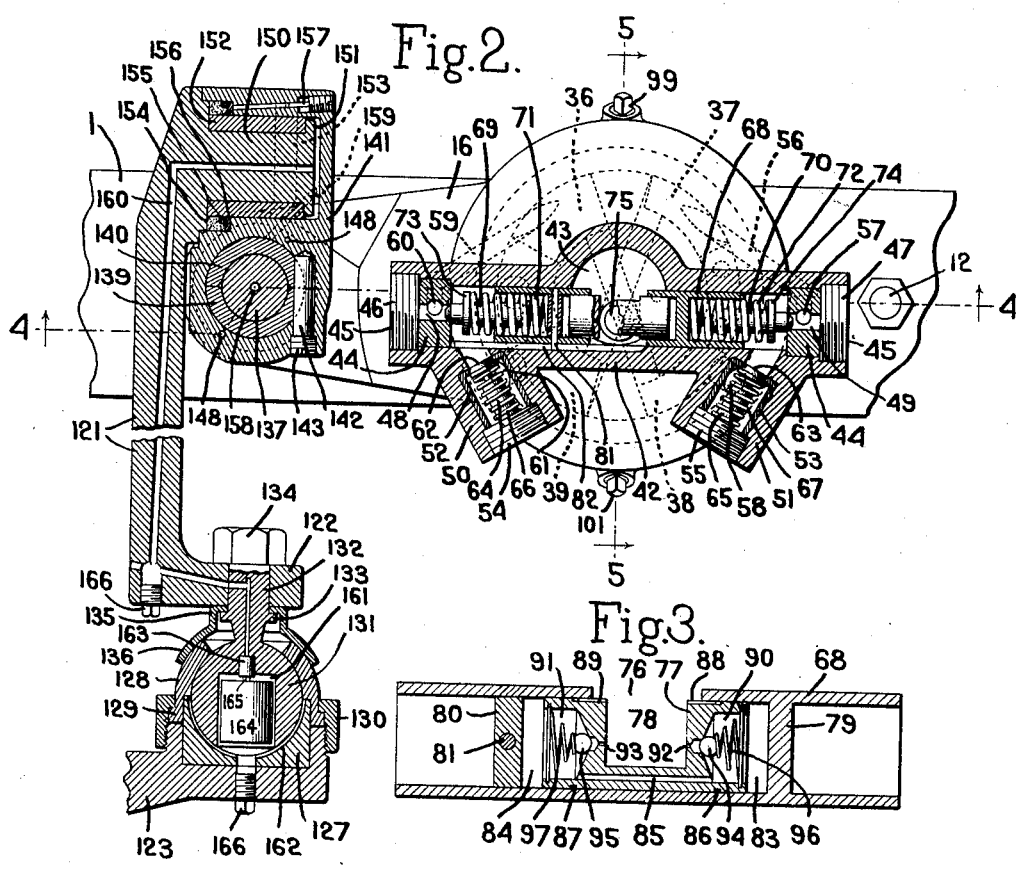
Fig. 2 is a view partially in side elevation, partially broken away and partially in vertical cross section taken on the line 2—2 of Fig. 4 illustrating some of the details of the specific construction of the device shown in Fig. 1.
Figure 3:
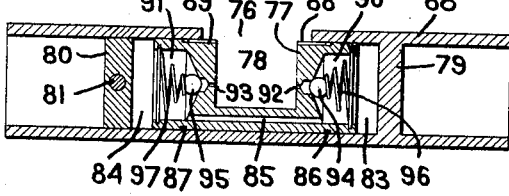
Fig. 3 is a view in horizontal transverse cross section of the dash-pot feature of the device.

The universal joint connecting the foot 122 of the strut with the bracket 123 is shown in detail in Fig. 2. It is of the ball and socket type. The socket portion comprises a base 127 seated in a recess in the bracket 123 and a cap 128 fitting over the base. The inner surface of the cap and base is spherical. The cap at the bottom presents an annular flange 129 and the entire socket member is held in place in the bracket by a flanged ring 130 fitting over the flange 129 and having a threaded connection with the bracket. The ball member 131 is adapted to fit snugly within the socket member and is provided with an upstanding shank 132 extending up through an opening in the top of the cap 128 which is of sufficient size to allow for the movement of the joint. The shank passes up through the foot 122 and beneath the foot is provided with an annular flange 133 and above the foot is threaded and provided with a nut 134. A protecting cover 135, which may be of metal, leather, or other suitable material, fits over the flange 133 and has a skirt 136, the inner surface of which is spherical and adapted to fit snugly against the exterior spherical surface of the socket cap 128. Thus as the ball and socket move relatively, the cover 135 prevents dirt or dust getting into the joint through the opening in the top of the cap 128. The ball member is firmly locked to the foot 122 by screwing up the nut 134, at the same time clamping the cover 135 in place.

The joint connection between the upper end of the strut 121 and the arm 16 is of that type which permits a relative swinging movement in both of two directions at right angles to each other and the construction is such that the parts are readily assembled and locked in assembled position with all the bearing surfaces protected. The arm 16 is provided with an integral bearing stud 137 extending parallel with the axis of the piston member 6 and this stud presents at its outer end a flanged head 138. A bearing sleeve in two semi-cylindrical sections 139 and 140 is assembled on the bearing stud 137 between the flanged head 138 and the arm 116 and the parts thus assembled are inserted endwise into a cylindrical recess in the bearing block 141. A locking pin 142 is inserted in a bore formed half in the bearing sleeve 139, 140 and half in the bearing block 141, the outer end of the pin being threaded at 143 into the bearing block. Thus it will be seen that this part of the joint is readily assembled and all the bearing surfaces are protected. In order further to protect the joint adjacent the arm 16, a packing gland is shown comprising a suitable felt or fibrous washer 144 inserted in an annular recess in the bearing block, a wire ring 145 holding the washer and a flat metal washer 146 seated on the fibrous washer. Into the bearing block 141 from the outer face 147 are drilled two or more holes. Pins 148 pass down through these holes and abut the washer 146 and these pins have enlarged heads 149 threaded into the bearing block. Thus by screwing up these pins, pressure may be placed upon the packing 144 to insure a tight joint. A similar connection at right angles to that just described is made between the bearing block 141 and the strut 121. In this case the strut is provided with the integral projecting bearing stud 150 having the flanged head 151. A similar two-part bearing sleeve 152 is assembled over the stud 150 and the parts inserted in a similar recess in the bearing block at right angles to the recess in which the stud 137 is inserted. A locking pin 153, shown in dotted lines in Fig. 2, similar to the locking pin 142, locks the stud 150 and bearing sleeve 152 in the bearing block. A packing gland comprising the fibrous washer 154, wire ring 155, metal washer 156 and washer adjusting pins 157, all similar to those just described, protect the joint adjacent the strut.

There is thus presented a link construction adapted to take both tension and compression and capable of conforming to any relative movement.

Means are also provided for thoroughly and continuously lubricating all the joints and bearing surfaces in this link connection. In the construction illustrated, this result is secured by feeding the oil supplied to the interior of the casing member 15 therefrom to the link. For this purpose a duct 158 extends from the bore in the boss 42 through the arm 16 and axially through the bearing stud 137. Thus the oil discharging form this duct will work around through the bearing surfaces between the stud 137 and the bearing block 141. A duct 159, shown chiefly in dotted lines in Fig. 2, extends through the bearing block from the space in which the duct 158 terminates to the space between the end of the bearing stud 150 and the bearing block and from this space the oil will work around all the bearing surfaces between this bearing stud and the bearing block. A duct 160 extends from the end of the bearing stud 150 therethrough, through the strut 121, through the foot 122 into the shank 132 of the ball member and opens into a chamber 161 formed in the ball 131. This chamber is open at the bottom and consequently the oil discharging into the chamber will work up around and lubricate the cooperating surfaces of the ball and socket member. A small groove 162, shown in dotted lines in Fig. 2, may be formed in the surface of the socket member to assist in the distribution of the oil.

The oil thus fed down through the strut 121 is forced along by the movement of the parts and is under more or less pressure, especially when the original supply comes from a reservoir such as 106 located at some distance above the ball and socket joint. In order, therefore, to prevent the oil from over-lubricating the ball and socket joint and working out from beneath the protecting cover 136, the invention provides a means for limiting the discharge of the oil from the duct 160. For this purpose a valve seat 163 is fitted into the ball 131 at the end of the duct 160 and a float 164 is placed in the chamber 161. This float carries a needle valve 165 cooperating with the valve seat member 163. These parts are so proportioned and constituted that when the oil rises to a predetermined level in the chamber 161, the needle valve will close the lower end of the duct 160 and thus prevent further discharge of the oil therefrom. Suitable drainage plugs 166 are provided at convenient points.

It will thus be seen that a device embodying this invention accomplishes the following results: unrestricted relative movement of the vehicle body and axle in either direction away from a normal point of separation; resisted return movement between the vehicle body and axle to this normal point; sinusoidal variation of the forces resisting this return movement; automatic adjustment of the operative, normal point within the device itself to correspond to variations in the normal relationship of the vehicle body and axle caused by change in load; resolution of the operative forces acting on the device, both torsional and radial, into hydraulic forces within the device itself, for the purpose of minimizing bearing forces; and a simple and effective fluid supply system for both hydraulic and lubrication purposes.

At the normal point of separation between the vehicle body and axle, the valves 69 and 70 are not held firmly on their seats by the springs 71 and 72. Hence, as the vehicle spring is deflected in either direction away from normal, the shock absorber will offer no resistance because the fluid will pass freely either through the bores 56 and 57, the chamber 49, past the valve 70 and the check valve 63 and through the bore 58, in the case of movement in one direction or through the corresponding bores, chamber, and past the corresponding valves on the other side of the shock absorber in the case of movement in the other direction. This allows the relative volumes of the operating chambers between the piston and casing of the shock absorber to be varied without impediments. As the deflection goes further in a direction away from the normal point, the valve 70 is further released by the recession of its spring 72 caused by the movement of the slide 68 which is in turn caused by the movement of the eccentric 75. Deflecting movement thus continues freely. If the deflection is in the opposite direction, the valve 69 and spring 71 act in a similar manner.

Upon the return movement of the spring, however, fluid must pass in the opposite direction through the opposite set of passages because a return through the same set of passages is blocked by the check valve 63 or 62. On this return movement the flow of the fluid is opposed by the valve 69 or the valve 70 held onto its seat by the spring 71 or the spring 72, whichever has been undergoing compression during the above-described movement of the slide 68. The flow of fluid, and consequently the return movement of the body and axle, will therefore be resisted during the return stroke until the movement of the eccentric 75 has again brought the slide 68 to the normal point where the springs 71 and 72 are exerting no pressure or only a very slight pressure.

During this return movement from either direction, the hydraulic pressure within the chambers of the shock absorber, and hence the torsional force delivered by the device, is determined by the force exerted by the spring 71 against the valve 69 or the spring 72 against the valve 70. The force thus exerted by these springs is determined by their degree of deflection caused by the horizontal movement of the slide 68, which is in turn caused by the movement of the eccentric 75. Hence it follows that the forces delivered by the device will be determined by the horizontal component of the movement of the eccentric 75. But, as is well known, the relationship between angular movement of an eccentric and a resulting straight line movement is a sinusoidal relation, that is, the amount of straight line movement is proportional to the sine of the angle described by the eccentric. Hence it is evident that the same relation exists in this shock absorber and that the forces delivered on the return stroke will vary sinusoidally with the angular deflection of the two main operative elements of the device. The operation of the dashpot load-adjusting device which is located within the slide 68 has already been described, as has the construction, illustrated diagrammatically in Fig. 10, whereby there is maintained by hydraulic means torsional equilibrium and substantial neutralization of thrust in the operation of the device. The reservoir for the fluid supplied both to the shock absorber and also for lubricating purposes and the lubricating systems to which it is supplied have also been fully set forth.

Having thus described the invention, what is claimed as new, and desired to be secured by Letters Patent, is:

1. A fluid-operated shock absorber for a vehicle having a body supported by a spring from an axle comprising a casing and a rotary piston therein connected the one to the body and the other to the axle to cause movement of one relatively to the other upon movement in either direction of the body relatively to the axle, presenting a plurality of radially and symmetrically disposed blades forming the end walls of sector chambers between the casing and piston hub, and means for controlling the flow of fluid between the chambers and thus from one side of the piston to the other to permit free relative rotation of the piston and casing in either direction away from normal position and to retard reverse relative rotation, the areas of the faces of each pair of symmetrically disposed blades and the angular relation of said faces being correlated to cause the net resultant radial thrust between the casing and piston caused by pressure in the chambers to be equal and opposite to the average radial thrust resulting from the reaction of the spring thus substantially to eliminate radial pressure between the casing and piston throughout the relative rotation thereof.

2. A fluid-operated shock absorber for a vehicle having a body supported by a spring from an axle comprising a casing and a rotary piston therein connected the one to the body and the other to the axle to cause movement of one relatively to the other upon movement in either direction of the body relatively to the axle, presenting a plurality of radially and symmetrically disposed blades forming the end walls of sector chambers between the casing and piston hub, and means for controlling the flow of fluid between the chambers and thus from one side of the piston to the other to permit free relative rotation of the piston and casing in either direction away from normal position and to retard reverse relative rotation, the areas of the faces of each pair of symmetrically disposed blades and the angular relation of said faces being correlated to cause the net resultant radial thrust between the casing and piston caused by pressure in the chambers to be equal and opposite to the average radial thrust resulting from the reaction of the spring and to cause the torsional resultants of the forces exerted on said faces and of the force exerted by the spring to be in equilibrium thus substantially to eliminate pressure between the casing and piston throughout the relative rotation thereof.

3. A fluid-operated shock absorber for a vehicle having a body supported by a spring from an axle comprising a casing and a rotary piston therein connected the one to the body and the other to the axle to cause movement of one relatively to the other upon movement in either direction of the body relatively to the axle, presenting a plurality of radially and symmetrically disposed blades forming the end walls of sector chambers between the casing and piston hub, and means for controlling the flow of fluid between the chambers and thus from one side of the piston to the other to permit free relative rotation of the piston and casing in either direction away from normal position and to retard reverse relative rotation, the areas of the faces of each pair of symmetrically disposed blades and the angular relation of said faces being correlated to cause the torsional resultants of the forces exerted on said faces and of the force exerted by the spring to be in equilibrium thus substantially to eliminate a pressure resultant due to torsion between the casing and piston throughout the relative rotation thereof.

4. A fluid-operated shock absorber for a vehicle having a body supported by a spring from an axle comprising a casing and a rotary piston therein connected the one to the body and the other to the axle to cause relative rotary movement thereof upon the occurrence of relative movement in either direction between the body and axle, oppositely disposed spring seated valves mounted in the casing for controlling the flow of the fluid in the casing from either side of the piston to the other and means connected to the piston acting upon relative rotary movement of the piston and casing in either direction away from normal position to compress the spring of one valve and relieve the spring of the other valve thus to permit such rotation to take place freely and to retard reverse rotation.

5. A shock absorber as described in claim 4, in which the said means includes a dash-pot device shiftable upon changes in static load to maintain equilibrium of the springs of said valves but only slightly responsive to ordinary deflections of the vehicle spring.

6. A fluid-operated shock absorber for a vehicle having a body supported by a spring on an axle comprising a casing and a rotary piston therein connected the one to the body and the other to the axle to cause rotation of one relatively to the other upon movement in either direction of the body relatively to the axle, the casing having an inner cylindrical wall from which project radially inward oppositely disposed blades having their inner surfaces concentric with the wall but of different radii, the rotary piston having oppositely disposed, radially extending blades, the outer surfaces of which fit the cylindrical wall of the casing and having a hub with its outer surfaces between the piston blades cylindrical and of radii corresponding respectively to the radii of the inner surfaces of the casing blades, and means connecting the diametrically opposite chambers formed between adjacent piston and casing blades to cause each pair to form in effect a single chamber.

7. A fluid-operated shock absorber for a vehicle having a body supported by a spring on an axle comprising a casing and a rotary piston therein connected the one to the body and the other to the axle to cause rotation of one relatively to the other upon movement in either direction of the body relatively to the axle, the casing having an inner cylindrical wall from which project radially inward oppositely disposed blades having their inner surfaces concentric with the wall but of different radii, the rotary piston having oppositely disposed, radially extending blades, the outer surfaces of which fit the cylindrical wall of the casing and having a hub with its outer surfaces between the piston blades cylindrical and of radii corresponding respectively to the radii of the inner surfaces of the casing blades, the said hub having passages therethrough connecting respectively diametrically opposite chambers formed between adjacent piston and casing blades so that each pair of opposite chambers forms in effect a single chamber.

8. A shock absorber as defined in claim 6, in which the radial lengths and the angular position of the casing blades are so related that when relative rotation resulting from the average dynamic load has taken place, the resultant radial thrust from the load on the axis of rotation will be neutralized.

9. A shock absorber as defined in claim 6, in which the radial lengths and the angular position of the casing blades are so related as to cause the torsional resultants of the forces exerted on said blades and of the force exerted by the spring to be in equilibrium thus substantially to eliminate a pressure resultant due to torsion between the casing and piston throughout the relative rotation thereof.

10. A fluid-operated shock absorber for a vehicle having a body supported by a spring from an axle comprising a casing and a rotary piston therein connected the one to the body and the other to the axle to cause rotation of one relatively to the other upon movement in either direction of the body relatively to the axle, the said piston dividing the casing into two chambers, two passages through the casing between said chambers, a port and a valve therefor in each passage, the said valves mounted to move rectilinearly in opposite directions and in alignment, a spring behind each valve acting to seat the valve upon its port, a slide member abutting both springs acting, when slid in either direction, to compress one and relieve the other spring, and a stud extending eccentrically from the piston and engaging the slide member to slide the same upon rotation of the piston relatively to the casing.

11. A fluid-operated shock absorber for a vehicle having a body supported by a spring from an axle comprising a casing and a rotary piston therein connected the one to the body and the other to the axle to cause rotation of one relatively to the other upon movement in either direction of the body relatively to the axle, the said piston dividing the casing into two chambers, two passages through the casing between said chambers, a port and a valve therefor in each passage, the said valves mounted to move rectilinearly in opposite directions and in alignment, a spring behind each valve acting to seat the valve upon its port, a slide member abutting both springs acting, when slid in either direction, to compress one and relieve the other spring, a dash-pot slidable in the slide member in alignment therewith, and a stud extending eccentrically from the piston and engaging the dash-pot to slide the same and the slide member upon sudden rotation of the piston relatively to the casing and gradually to slide the dash-pot relatively to the slide member upon a change in the static load of the vehicle.

12. A fluid-operated shock absorber for a vehicle having a body supported by a spring from an axle comprising a casing member and a piston member therein, an arm rigid with and extending from one of said members, a link having bearing connections with said arm and with the axle, and means for non-rotatably securing the other member to the body, one of the casing and piston members having a duct therein extending from the outside of the casing to the inside thereof and the said arm having a duct therein connecting the inside of the casing and the bearing between the arm and the link whereby fluid supplied to the first duct from outside of the casing maintains the amount of fluid required for the cooperation of the casing and piston members and by being supplied from the inside of the casing through the second duct provides lubrication for the bearing between the arm and the link.

13. A fluid-operated shock absorber constructed as in claim 12, together with an oil reservoir mounted on the body above the level of the casing and communicating with the outside end of the duct extending to the inside of the casing.

14. A vehicle comprising a plurality of oil-controlled shock absorbers, an oil reservoir mounted on the vehicle above the level of the shock absorbers, conduits leading from the reservoir to each shock absorber to maintain it filled with oil, an oil circulating system including a pump, a conduit connection from said system to said reservoir, the said pump acting to cause the oil to be pumped continuously into the reservoir, and an overflow conduit from the reservoir back to the system.

15. A vehicle comprising a plurality of oil-controlled shock absorbers, an oil reservoir mounted on the vehicle above the level of the shock absorbers, conduits leading from the reservoir to each shock absorber to maintain it filled with oil, an oil circulating system including a pump, a by-pass conduit from the pump to said reservoir and an overflow conduit from the reservoir to the system to cause the pump to maintain the reservoir full of oil.

16. A vehicle comprising the construction defined in claim 15, together with a valve in the by-pass conduit for regulating the flow of oil therethrough to the reservoir.

17. A shock absorber for two spring-connected bodies which have a limited spring distorting movement toward and from each other, comprising two members relatively rotatable one within the other and exteriorly connected respectively to said bodies and means, including a governing device movable rectilinearly with respect to one of said members, acting to check predetermined relative rotary movements of said members and mechanically transmitting means acting to transform relative rotary movement of said members into rectilinear movement of said governing device.

18. A shock absorber for two spring-connected bodies which have a limited spring distorting movement toward and from each other, comprising two members relatively rotatable one within the other and exteriorly connected respectively to said bodies and means, including a governing device movable rectilinearly with respect to one of said members, acting to permit certain predetermined relative rotary movements of said members and to check certain others and mechanically transmitting means acting to transform relative rotary movement of said members into rectilinear movement of said governing device.

19. A shock absorber for two spring-connected bodies which have a limited spring distorting movement toward and from each other, comprising two members relatively rotatable one within the other and exteriorly connected respectively to said bodies, means, including a governing device movable rectilinearly with respect to one of said members, acting to check predetermined relative rotary movements of said members, and an eccentric device on one of said members engaging the governing device and effecting its rectilinear movement upon the relative rotary movement of said members.

20. A shock absorber for two spring-connected bodies which have a limited spring distorting movement toward and from each other, comprising two members relatively rotatable one within the other and exteriorly connected respectively to said bodies, and means, including yielding pressure-exerting mechanism the force of which varies sinusoidally with the progressive relative movements of said members, acting to check predetermined relative rotary movements of said members.

21. A shock absorber comprising the construction defined in claim 17, together with means for rectilinearly adjusting the governing device to compensate for changes in the normal position of said two bodies relatively to each other.

22. A shock absorber comprising the construction defined in claim 17, together with means acting automatically upon a change in the normal position of said two bodies relatively to each other to adjust the governing device rectilinearly to compensate for said change.

23. A shock absorber for two spring connected bodies which have a limited spring distorting movement toward and from each other comprising a piston chamber member and a rotary piston member therein in which all the wall surfaces with which the piston member is in slidable engagement are in fixed relation to each other and to the piston chamber member, the said piston member and piston chamber member being connected respectively to said bodies, means permitting free relative rotary movement of the said members in either direction away from a normal position and acting to retard the reverse relative rotation with a force varying in approximate proportion to the variation in the extent of the concurrent relative movement of the two bodies toward or from each other, and means for adjusting the force exerted between the two members to conform to changes in the normal position of said bodies with respect to each other.

24. A shock absorber for two spring connected bodies which have a limited spring distorting movement toward and from each other comprising a piston chamber member and a rotary piston member therein in which all the wall surfaces with which the piston member is in slidable engagement are in fixed relation to each other and to the piston chamber member, the said piston member and piston chamber member being connected respectively to said bodies, means permitting free relative rotary movement of the said members in either direction away from a normal position and acting to retard the reverse relative rotation with a force varying in approximate proportion to the variation in the extent of the concurrent relative movement of the two bodies toward or from each other, and means acting automatically upon a change in the normal position of said bodies with respect to each other to adjust the force exerted upon the two members to compensate for such change.

25. A shock absorber for two spring connected bodies which have a limited spring distorting movement toward and from each other comprising a piston chamber member and a rotary piston member therein in which all the wall surfaces with which the piston member is in slidable engagement are in fixed relation to each other and to the piston chamber member, the said piston member and piston chamber member being connected respectively to said bodies, means acting to retard the relative rotary movement of the said members in either direction for predetermined periods with a force varying in approximate proportion to the variation in the extent of the concurrent relative movement of the two bodies toward or from each other, and means for adjusting the force exerted between the two members to conform to changes in the normal position of said bodies with respect to each other.

26. A shock absorber for a vehicle having a body supported by a spring from an axle comprising two members, one connected to the body and the other to the axle, in which one of said connections includes a lever arm projecting from the member, and means acting to maintain substantial torsional equilibrium between the force at the end of the lever arm acting to move the two members relatively in one direction and the forces acting between the two members to move them relatively in the opposite direction.

27. A fluid-operated shock absorber for two bodies having a limited movement toward and from each other comprising two members relatively rotatable about a common axis and exteriorly connected respectively to said bodies and means whereby the torsional force exerted on said members by movement of the bodies is absorbed wholly by fluid resistance.

28. A fluid-operated shock absorber for two bodies having a limited movement toward and from each other comprising two members relatively rotatable about a common axis, a lever arm projecting laterally from one member, means for connecting the lever arm of said member to one body means connecting the other member to the other body, and means whereby the whole force exerted at the end of the lever arm is substantially absorbed by fluid resistance throughout the major range of rotation.

29. A fluid-operated shock absorber for a vehicle having a body supported by a spring from an axle comprising two members, one connected to the body and the other to the axle, in which one of said connections includes a lever arm projecting from the member, and means acting to cause the fluid pressure exerted between the two members to oppose and substantially neutralize the radial thrust along the lever arm during the normal range of its average movement.

30. A shock absorber for two spring-connected bodies which have a limited spring distorting movement toward and from each other, comprising two members relatively rotatable toward and from a normal position one within the other and exteriorly connected respectively to said bodies, and yielding means acting by pressure to check predetermined relative rotary movements of said members, the said yielding means having a fixed point of engagement at one end to the outer member and a point of engagement at the other end to the inner member variable upon a change in the normal relative rotary position of the members.

31. A spring reaction neutralizer comprising relatively rotary, pressure controlled members and an eccentric on one of the members determining by its movement with said member from a normal average position in both directions the value of the pressures controlling the relative rotary movements of said members.

32. A fluid-operated shock absorber for a vehicle having two relatively movable elements, viz., an axle and a body supported by a spring therefrom, comprising a casing member and a piston member therein, an arm rigid with and extending from one of said members, a link having bearing connections with said arm and with one of said elements, and means for non-rotatably securing the other member to the other element of the vehicle, a duct extending through one of the casing and piston members from the outside of the casing to the inside thereof, and through the said arm connecting the inside of the casing and the bearing between the arm and the link, whereby fluid supplied to the first duct from outside of the casing maintains the amount of fluid required for the cooperation of the casing and piston members and by being supplied from the inside of the casing through the second duct provides lubrication for the bearing between the arm and the link.

33. A fluid-operated shock absorber constructed as in claim 32, together with an oil reservoir communicating with the duct and mounted on the vehicle at a level to enable it to fill the duct by gravity flow.

GROSVENOR M. CROSS.